United States Patent [19]

Plank et al.

[11] Patent Number: 4,994,251

[45] Date of Patent: * Feb. 19, 1991

[54] METHOD FOR PRODUCING ZEOLITES

[75] Inventors: Charles J. Plank, Woodbury; Edward J. Rosinski, Pedricktown, both of N.J.; Mae K. Rubin, Bala Cynwyd, Pa.

[73] Assignee: Mobil Oil Corporation, Fairfax, Va.

[*] Notice: The portion of the term of this patent subsequent to Nov. 20, 1996 has been disclaimed.

[21] Appl. No.: 317,735

[22] Filed: Nov. 3, 1981

Related U.S. Application Data

[60] Continuation-in-part of Ser. No. 169,005, Jul. 15, 1980, Pat. No. 4,341,748, which is a division of Ser. No. 23,117, Mar. 23, 1979, abandoned, which is a continuation-in-part of Ser. No. 841,622, Oct. 13, 1977, Pat. No. 4,175,114, which is a continuation-in-part of Ser. No. 650,481, Jan. 19, 1976, abandoned, which is a continuation-in-part of Ser. No. 424,481, Dec. 13, 1973, abandoned.

[51] Int. Cl.$^5$ ............................................. C01B 33/34
[52] U.S. Cl. .................................... 423/328; 423/329; 502/77
[58] Field of Search ............................ 423/328–330; 253/455

[56] References Cited

U.S. PATENT DOCUMENTS 3,702,886 11/1972 Argauer et al. ..................... 423/328
4,061,724 12/1977 Grose et al. ........................ 423/335
4,175,114 11/1979 Plank et al. ........................ 423/329
4,257,885 3/1981 Grose et al. ........................ 210/691
4,269,813 5/1981 Klotz .................................. 423/277
4,341,748 7/1982 Plank et al. ........................ 423/328

FOREIGN PATENT DOCUMENTS 2704039 8/1977 Fed. Rep. of Germany .

Primary Examiner—Curtis R. Davis
Assistant Examiner—R. Bruce Breneman
Attorney, Agent, or Firm—Alexander J. McKillop; Charles J. Speciale; Malcolm D. Keen

[57] ABSTRACT

As synthesized by previous methods, ZSM-5 or ZSM-11 zeolites are crystallized in the presence of substantial amounts of a nitrogen-containing compound. When synthesized in this way, they contain an organic ammonium cation as well as a metal cation such as sodium. To obtain a more active form, the sodium ion must be exchanged out. Such exchange, especially with ZSM-5 and ZSM-11, is difficult unless there is calcination of the zeolite to remove the obstructing organo compounds. By making these zeolites in the presence of (1) seeds of the desired zeolite, (2) mixtures of them with ammonium hydroxide and/or alcohol, (3) the alcohol per se or (4) mixtures of the alcohol with ammonium hydroxide, a product substantially deficient in organic ammonium cation is obtained. These products can be exchanged directly without any calcination.

10 Claims, No Drawings

METHOD FOR PRODUCING ZEOLITES

CROSS REFERENCE TO RELATED APPLICATIONS

This application is a continuation-in-part of application Ser. No. 169,005, filed July 15, 1980, now U.S. Pat. No. 4,341,748, as a division of application Ser. No. 23,117, filed Mar. 23, 1979, now abandoned, as a continuation-in-part of U.S. application Ser. No. 841,622, filed Oct. 13, 1977; now U.S. Pat. No. 4,175,114 the same being a continuation-in-part of U.S. application Ser. No. 650,481, filed Jan. 19, 1976, now abandoned, as a continuation-in-part of U.S. application Ser. No. 424,481, filed Dec. 13, 1973, now abandoned.

BACKGROUND OF THE INVENTION

1. Field of the Invention

The invention relates to a process for making zeolites. More particularly it relates to making ZSM-5 or ZSM-11 zeolites which, in their synthesized form, are low in nitrogen content.

2. Summary of the Prior Art

Zeolites of the ZSM-5 type (e.g. ZSM-5 and ZSM-11) and others like zeolite Beta, TEA mordenite and ZSM-12 have been crystallized from a solution containing organic cations, particularly including alkyl ammonium cations. Zeolites ZSM-5 and ZSM-11, in general, have a pore size greater than the 5 Angstrom materials and less than the large pore zeolites such as Zeolite X, Zeolite Beta and the like.

U.S. Pat. No. 3,702,886 is concerned with the zeolite ZSM-5 and some of its uses. U.S. Pat. No. 3,709,979 discloses and claims ZSM-11. So the description of these two zeolites may be complete, the two U.S. patents are hereby incorporated herein by reference. Neither of these patents suggests or teaches the use of ZSM-5 or ZSM-11 seeds to prepare the respective zeolites.

In addition, U.S. Pat. No. 3,119,659 discloses the use of the same type of molecular sieve being produced, as do U.S. Pat. Nos. 3,321,272 and 3,532,459. U.S. Pat. No. 3,671,191 teaches a general seeding technique, as does an article by Zhdanov, "Molecular Sieve Zeolites-I" ACS, 1971, pages 36 and 37. German No. 2,212,810 discloses the use of a mixture of ethyl alcohol, ammonium hydroxide and triethylamine to make ZSM-8 and of a mixture of ammonia, propyl alcohol and tripropylamine to make ZSM-5.

SUMMARY OF THE INVENTION

In accordance with the invention, there is provided a method for synthesizing a ZSM-5 or ZSM-11 crystalline aluminosilicate substantially deficient in nitrogen, preferably no more than about 0.2% by weight, which comprises carrying out the reaction to form said zeolite in the presence of a member selected from the group consisting of ZSM-5 seeds, ZSM-11 seeds and mixtures thereof with NH$_4$OH and/or alcohol. It is to be understood that when seeds are used, ZSM-5 seeds produce ZSM-5 and ZSM-11 seeds produce ZSM-11. This is true whether they are used alone or in a mixture as set forth. It will also be understood that the members included are: (1) ZSM-5 or ZSM-11 seeds; (2) ZSM-5 or ZSM-11 seeds plus alcohol; (3) ZSM-5 or ZSM-11 seeds plus NH$_4$OH; (4) ZSM-5 or ZSM-11 seeds plus alcohol plus NH$_4$OH; (5) alcohol; and (6) alcohol plus NH$_4$OH.

The aliphatic alcohol preferably is an alcohol containing 2 to 5 carbon atoms. Illustrative are ethanol, propanol, butanol and pentanol. It is contemplated that the alcohols may be straight or branch chain.

ZSM-5 and ZSM-11 seeds may be from previously prepared batches of ZSM-5 or ZSM-11 made by present methods. Alternatively, seeds of ZSM-5 or ZSM-11 prepared by the process of this invention may be used. Furthermore, it has been discovered that when subsequent batches of ZSM-5 or ZSM-11 zeolites are made in the same equipment, the residual zeolite is sufficient to supply the requisite amount of seeds.

Only a small amount of seeds are needed for the practice of this invention. Generally, from about 0.01% by weight to about 10% by weight of final product is sufficient. We prefer, however, to use from about 1% by weight to 6% by weight.

DESCRIPTION OF SPECIFIC EMBODIMENTS

ZSM-5 has the characteristic X-ray diffraction pattern set forth in Table 1 of U.S. Pat. No. 3,702,866, whether produced by prior art methods or by the method of this invention. ZSM-5 compositions (as well as ZSM-11 compositions) can also be identified in terms of mole ratios of oxides as follows:

$$0.9 \pm 0.2 \frac{M_2O}{n} : W_2O_3 : XYO_2 : ZH_2O$$

wherein M is a cation, n is the valence of said cation, W is selected from the group consisting of aluminum and gallium, Y is selected from the group consisting of silicon and germanium, X is from about 5 to about 3000 and Z is from 0 to 40. In a preferred form as synthesized by prior art methods the zeolite has a formula, in terms of mole ratios of oxides as follows:

$$0.9 \pm 0.2 \frac{M_2O}{n} : Al_2O_3 : XSiO_2 : ZH_2O$$

wherein M is selected from the group consisting of a mixture of alkali metal cations, especially sodium, and tetraalkammonium cations, the alkyl groups of which preferably contain 2–5 carbon atoms. In this preferred embodiment of ZSM-5, W is aluminum and Y is silicon. Also the preferred silica/alumina ratio is from about 15 to about 900. More preferably, the silica/alumina ratio is from about 30 to about 350.

Zeolite ZSM-5 is prepared by prior art methods by preparing a solution containing water, tetrapropyl ammonium hydroxide and the elements of sodium oxide, an oxide of aluminum or gallium and an oxide of silica, and having a composition, in terms of mole ratios of oxides, falling within the following ranges:

TABLE A

|  | Broad | Preferred | Particularly Preferred |
|---|---|---|---|
| $\frac{OH^-}{SiO_2}$ | 0.07–1.0 | 0.1–0.8 | 0.2–0.75 |
| $\frac{R_4N^+}{(R_4N^+ + Na^+)}$ | 0.2–0.95 | 0.3–0.9 | 0.4–0.9 |
| $\frac{H_2O}{OH^-}$ | 10–300 | 10–300 | 10–300 |

TABLE A-continued

|  | Broad | Preferred | Particularly Preferred |
|---|---|---|---|
| $\dfrac{YO_2}{W_2O_3}$ | 5–100 | 10–60 | 10–40 |

The solution is maintained at reaction conditions until the crystals of the zeolite are formed. Thereafter the crystals are separated from the liquid and recovered. Typical reaction conditions consist of a temperature of from about 75° C. to 175° C. for a period of about six hours to 60 days. A more preferred temperature range is from about 90° to 150° C., with the amount of time at a temperature in such range being from about 12 hours to 20 days.

For complete details of the preparation of ZSM-5 by a prior art method, U.S. Pat. No. 3,702,886 is incorporated herein by reference.

ZSM-11 can be suitably prepared by prior art methods, by preparing a solution $(R_4X)_2O$, sodium oxide, an oxide of aluminum or gallium, an oxide of silicon or germanium and water and having a composition, in terms of mole ratios of oxides, falling within the following ranges:

TABLE B

|  | Broad | Preferred |
|---|---|---|
| $\dfrac{YO_2}{W_2O_3}$ | 10–150 | 20–90 |
| $\dfrac{Na_2O}{YO_2}$ | 0.05–0.70 | 0.05–0.40 |
| $\dfrac{(R_4X)_2O}{YO_2}$ | 0.02–0.20 | 0.02–0.15 |
| $\dfrac{H_2O}{Na_2O}$ | 50–800 | 100–600 | wherein $R_4X$ is a cation of a quarternary compound of an element of Group 5A of the Periodic Table, W is aluminum or gallium and Y is silicon or germanium maintaining the mixture until crystals of the zeolite are formed. Preferably, crystallization is performed under pressure in a stirred autoclave or static bomb reactor. The temperature ranges from 100° C. to 200° C., generally, but at lower temperatures, e.g. about 100° C., crystallization time is longer. Thereafter the crystals are separated from the liquid and recovered. The new zeolite is preferably formed in an aluminosilicate form.

For complete details of the preparation of ZSM-11, U.S. Pat. No. 3,709,979 is incorporated herein by reference.

In preferred form, the zeolite made by the method of this invention, has a formula, in terms of mole ratios of oxides as follows:

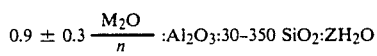

$$0.9 \pm 0.3 \dfrac{M_2O}{n} : Al_2O_3 : 30\text{–}350\ SiO_2 : ZH_2O$$

wherein M is an alkali metal or an alkaline earth metal and Z is 0 to 40.

The ZSM-5 made by the method of this invention is, as is the same zeolite made according to the prior art, preferably formed as the aluminosilicate, and it can be prepared utilizing materials which supply the elements of the appropriate oxide. Such materials include aluminum sulfate, a mineral acid such as sulfuric acid, sodium aluminate, alumina, sodium silicate, silica hydrosol, silica gel, silicic acid, sodium hydroxide, along with the reagents of the improved method of this invention. It will be understood that each oxide component utilized in the reaction mixture for preparing ZSM-5 can be supplied by one or more initial reactants, and they can be mixed together in any order. For example, sodium oxide can be supplied by an aqueous solution of sodium hydroxide or an aqueous solution of sodium silicate. To make the ZSM-5 using the present invention, a solution similar to that mentioned for Table A, but having a composition comprising materials having the following mole ratios of oxides may be used:

TABLE C-1

|  | Broad | Preferred | Particularly Preferred |
|---|---|---|---|
| $\dfrac{OH^-}{SiO_2}$ | 0.07–1.0 | 0.1–0.8 | 0.2–0.75 |
| $\dfrac{H_2O}{OH^-}$ | 10–300 | 10–300 | 10–300 |
| $\dfrac{SiO_2}{Al_2O_3}$ | 5–100 | 10–60 | 10–40 |
| $\dfrac{Alcohol}{Al_2O_3}$ | 0–400 | 0–300 | 0–150 |
| $\dfrac{NH_4OH}{Al_2O_3}$ | 0–250 | 0–150 | 0–100 |

It should be noted that in Table C-1 the $OH^-$ in the $NH_4OH$ is not included in the two ratios including that ion.

Stated on a different basis the values given in Table C-1 are the same as those set out in Table C-2 below:

TABLE C-2

|  | Preferred | Particularly Preferred |
|---|---|---|
| $\dfrac{Na_2O_3}{SiO_2}$ | 0.035–0.5 | 0.05–0.4 | 0.1–0.375 |
| $\dfrac{H_2O}{Na_2O}$ | 20–600 | 20–600 | 20–600 |
| $\dfrac{SiO_2}{Al_2O_3}$ | 5–100 | 10–60 | 10–40 |
| $\dfrac{Alcohol}{Al_2O_3}$ | 0–400 | 0–300 | 0–150 |
| $\dfrac{NH_4OH}{Al_2O_3}$ | 0–250 | 0–150 | 0–100 |

The reaction mixture can be prepared in either a batchwise or continuous manner. Crystal size and crystallization time of the ZSM-5 composition will vary with the nature of the reaction mixture employed.

The ZSM-5 product prepared in accordance with the present invention will exhibit an X-ray powder diffraction pattern conforming to Table C-3:

TABLE C-3

| Interplanar Spacing d (A) | Relative Intensity |
|---|---|
| 11.1 ± 0.2 | S |
| 10.0 ± 0.2 | S |
| 7.4 ± 0.15 | W |
| 7.1 ± 0.15 | W |

TABLE C-3-continued

| Interplanar Spacing d (A) | Relative Intensity |
| --- | --- |
| 6.3 ± 0.1 | W |
| 6.04 ⎫ ± 0.1<br>5.97 ⎭ | W |
| 5.56 ± 0.1 | W |
| 5.01 ± 0.1 | W |
| 4.60 ± 0.08 | W |
| 4.25 ± 0.08 | W |
| 3.85 ± 0.07 | VS |
| 3.71 ± 0.05 | S |
| 3.04 ± 0.03 | S |
| 2.99 ± 0.02 | W |
| 2.94 ± 0.02 | W |

The zeolites, both, ZSM-5 and ZSM-11, prepared according to this invention, after being calcined in air at a temperature of 600° C., have infra-red spectra exhibiting substantially no absorption within the range of 3600–3100 cm$^{-1}$.

ZSM-11 made by the method of this invention is also preferably made as the aluminosilicate utilizing reactants which supply the needed oxides. Thus, the reaction mixture may comprise reactants to yield an alkali-metal oxide, e.g. sodium oxide, alumina and silica. The reaction mixture, which also comprises water and the reagents of the present improved method, will have a composition, in terms of mole ratios of oxides, as follows:

TABLE D

| | Broad | Preferred |
| --- | --- | --- |
| $\dfrac{SiO_2}{Al_2O_3}$ | 10–150 | 20–90 |
| $\dfrac{Na_2O}{SiO_2}$ | 0.05–0.70 | 0.05–0.40 |
| $\dfrac{H_2O}{Na_2O}$ | 50–800 | 100–600 |
| $\dfrac{Alcohol}{Al_2O_3}$ | 0–400 | 0–300 |
| $\dfrac{NH_4OH}{Al_2O_3}$ | 0–250 | 0–150 |

The ZSM-5 and ZSM-11 zeolites produced by the method of the present invention have, as has already been stated, essentially the same X-ray diffraction as those prepared by conventional prior art methods. The products can also be expressed in terms of mole ratios of oxides as set forth hereinabove.

The ZSM-5 and ZSM-11 zeolites, as prepared by prior art methods, are useful, for example, as cracking and hydrocracking catalysts as well as catalysts for M-forming and dewaxing. However in order to increase their range of activities and their stability, it is necessary to remove the original metal ion, usually sodium. The original metal of most zeolites can be removed by conventional exchange procedures, as by multiple exchanges i.e. one exchange followed by another, etc. Some zeolites, ZSM-5 and ZSM-11 included, are not susceptible to this method of exchange, the sodium content reaching a plateau and remaining there regardless of the number of additional exchanges. It has been previously discovered that calcination of the zeolite by removing the organic N-containing cations "frees" the sodium so it can thereafter be removed easily. Typical replacing cations would include hydrogen, ammonium and metal cations, including mixtures of the same. Of the replacing cations, particular preference is given to cations of hydrogen, ammonium, rare earth, magnesium, zinc, calcium, nickel, and mixtures thereof, generally employed in the form of their salts, preferably the chlorides, nitrates or sulfates. This precalcination is not necessary, although it may still be used to remove the sodium cation from the products of this invention.

Representative, more detailed ion exchange techniques are disclosed in a wide variety of patents, including U.S. Pat. Nos. 3,140,249, 3,140,251, 3,140,253 and 3,702,866.

Following contact with the salt solution of the desired replacing cation, the zeolites prepared in accordance with this invention may be washed with water and dried at a temperature ranging from 150° F. to about 600° F. and thereafter may be heated in air or other inert gas at temperatures ranging from about 500° F. to 1500° F. for periods of time ranging from 1 to 48 hours or more. The zeolites thus produced and treated are also useful as cracking catalyst in cracking, hydrocracking, M-forming and dewaxing operation.

It is also possible to treat the zeolite with steam at elevated temperatures ranging from 800° F. to 1800° F. and preferably 1000° F. and 1500° F., if such is desired. The treatment may be accomplished in atmospheres consisting partially or entirely of steam.

A similar treatment can be accomplished at lower temperatures and elevated pressures, e.g. 350°–700° F. at 10 to about 200 atmospheres.

The zeolites produced in the method of this invention may be used in a porous matrix. The zeolites can be combined, dispersed or otherwise intimately admixed with a porous matrix in such proportions that the resulting product contains from 1% to 95% by weight, and preferably from 1 to 70% by weight of the zeolite in the final composite.

The term "porous matrix" includes inorganic compositions with which the aluminosilicates can be combined, dispersed or otherwise intimately admixed wherein the matrix may be active or inactive. It is to be understood that the porosity of the compositions employed as a matrix can either be inherent in the particular material or it can be introduced by mechanical or chemical means. Inorganic compositions especially those of a siliceous nature are preferred. Of these matrices inorganic oxides such as clay, chemically treated clay, alumina, silica, silica-alumina, etc. are particularly preferred because of their superior porosity, attrition resistance, and stability. More preferably, alumina is the matrix, and it is preferably combined with the zeolite prior to calcination.

Techniques for incorporating the zeolites in a matrix are conventional in the art and are set forth in U.S. Pat. No. 3,140,253.

The following Examples serve to illustrate the scope of the invention showing the ZSM-5 crystalline aluminosilicates containing very low levels of organic nitrogen can be made by various techniques. It will be understood that the examples are not intended in any way to place a limitation on the invention.

A typical preparation of ZSM-5 according to the invention is given hereinbelow. The details and results for the product produced are listed in Example 1 of Table 1. An acid alumina solution comprising 12.3 gms of $Al_2(SO_4)_3.18H_2O$, 30.0 gms 98% $H_2SO_4$ and 600 gms of $H_2O$ was added to a sodium silicate solution made by mixing 36.0 gms of Q-Brand sodium silicate (28.8% SiO₂, 8.9% Na₂O, 62.4% H₂O) and 450 gms water. To the resultant gel was added 124 gms ethanol. The gel was mixed with the alcohol until homogeneous and crystallized at autogenous pressure in a stirred autoclave at 350° F. for 24 hours. The resultant solid material was water washed and dried at 230° F.

Examples 2-12 were made in a similar manner using the ingredients and conditions as shown in Tables 1-5.

Several of these examples were ion exchanged with ammonium salts without any prior calcination to show that sodium was easily replaced in such a procedure. Results were excellent as indicated in the appropriate tables.

TABLE 1

| | Ethanol | |
|---|---|---|
| Example | 1 | 2 |
| Mix Components, gms | | |
| A. Q Brand | 360 | 360 |
| H₂O | 450 | 450 |
| B. Al₂(SO₄)₃·18H₂O | 12.3 | 12.3 |
| H₂SO₄ (98%) | 30.0 | 30.0 |
| H₂O | 600 | 600 |
| C. Ethanol | 124 | 124 |
| Mole Ratio of Mix | | |
| Ethanol | 146 | 146 |
| Na₂O | 8.6 | 8.6 |
| Al₂O₃ | 1.0 | 1.0 |
| SiO₂ | 94 | 94 |
| H₂O | 3870 | 3870 |
| Na₂SO₄ | 19.0 | 19.0 |
| Crystallization | Stirred | Stirred |
| Temp., °F. | 350 | 350 |
| Time, hrs | 24 | 24 |
| Product | | |
| X-Ray Analysis | ZSM-5 | ZSM-5 |
| % Crystallinity | 90 | 135 |
| Composition, wt % | | |
| N | 0.03 | <0.01 |
| Na | 1.2 | 1.0 |
| Al₂O₃ | 2.35 | 2.07 |
| SiO₂ | 94.5 | 93.8 |
| Composition, mole Ratio | | |
| N₂O | 0.05 | |
| Na₂O | 1.14 | 1.07 |
| Al₂O₃ | 1.0 | 1.0 |
| SiO₂ | 68.5 | 77.0 |
| Catalytic Properties | | |
| M-Forming Screening Test (600° F., 400 psig, 15 WHSV, 3/1 H₂/HC) (1.5 g catalyst - charged 50/50 wt n-heptane/benzene) | | |
| Type Catalyst | H+ [1] | H+ |
| n-Heptane Conv. wt % | 65.4 | 68.2 |
| Benzene Conv., wt % | 24.6 | 27.1 |
| C₇+ Aromatics Prod., wt % | 21.4 | 23.2 |
| Selectivity | 0.28 | 0.28 |

[1] Pre-calcination, 1000° F. + NH₄ Exchange

TABLE 2

| | Ethanol and Seeds | |
|---|---|---|
| Example | 3 | 4 |
| Starting Compositions, gms. | | |
| A. Q-Brand | 45.0 | 360 |
| H₂O | 56.3 | 450 |
| B. Al₂(SO₄)₃·18H₂O | 1.54 | 12.3 |
| H₂SO₄ (98%) | 3.75 | 30.0 |
| H₂O | 77.0 | 600 |
| C. Ethanol | 15.5 | 94.0 |
| D. ZSM-5 seeds (19.3% Solids) | 3.25 | 26.0 |
| Mix Ratio - Moles | | |
| Ethanol | 111.0 | 111.0 |
| Na₂O | 8.6 | 8.6 |
| Na₂SO₄ | 19.0 | 19.0 |
| Al₂O₃ | 1.0 | 1.0 |
| SiO₂ | 94.0 | 94.0 |
| H₂O | 3870 | 3870 |
| Crystallization. | | |
| Temp. °F. | 350 | 350 |
| Time, hrs | 97 | 21 |
| Product | | |
| X-Ray Analysis | ZSM-5 | ZSM-5 |
| % Crystallinity | 90 | 80 |
| Composition, wt % | | |
| N | 0.024 | 0.037 |
| Na | 1.50 | 1.20 |
| Al₂O₃ | 2.21 | 4.15 |
| SiO₂ | | 97.7 |
| Composition, Molar Ratio | | |
| Na₂O | 1.5 | 0.64 |
| Al₂O₃ | 1.0 | 1.0 |
| SiO₂ | | 40.0 |

TABLE 3

| | Seeds Only | |
|---|---|---|
| Examples | 5 | 6 |
| Starting Components, gms. | | |
| A. Q-Brand | 45.0 | 450 |
| H₂O | 56.3 | 563 |
| B. Al₂(SO₄)₃·18H₂O | 1.54 | 15.4 |
| H₂SO₄ (98%) | 3.75 | 37.5 |
| H₂O | 77.0 | 770 |
| C. ZSM-5 seeds (19.3% Solids) | 3.25 | 32.5 |
| Mixed Ratio - Moles | | |
| Na₂O | 8.6 | 8.6 |
| Na₂SO₄ | 19.0 | 19.0 |
| Al₂O₃ | 1.0 | 1.0 |
| SiO₂ | 94.0 | 94.0 |
| H₂O | 3870 | 3870 |
| ZSM-5, % Final Product | 5.7 | 5.7 |
| Crystallizaton | Static | Stirred |
| Temp. °F. | 350 | 350 |
| Time, hrs. | 96 | 24 |
| Product | | |
| X-Ray Analysis | ZSM-5 | ZSM-5 |
| % Crystallinity | 90 | 105 |
| Composition, wt % | | |
| N | 0.02 | 0.03 |
| Na | 1.50[1] | 1.79[1] |
| Al₂O₃ | 2.40 | 2.44 |
| SiO₂ | | 97.2 |
| Composition, Molar Ratio | | |
| Na₂O | 1.38 | 1.63 |
| Al₂O₃ | 1.0 | 1.0 |
| SiO₂ | | 67.8 |
| Catalytic Properties | | |
| (M-Forming Screening Test) (600° F., 400 psig, 15 WHSV, 3/1 H₂/HC, 1.5 gms. cat.) | | |
| Type Catalyst | | H+ [2] |
| n-Heptane Conv., wt % | | 89.6 |
| Benzene, Conv., wt % | | 30.8 |
| C₇+ Aromatics Prod., wt % | | 29.2 |
| Selectivity | | 0.31 |

[1] This value is reduced to 0.087% on Example 5 and 0.04% on Example 6 when exchanged with NH₄Cl without any precalcination.
[2] Pre-calcination, 1000° F. + NH₄ exchange.

TABLE 4

| | Ethanol + NH₄OH |
|---|---|
| Example | 7 |
| Mix Components, gms | |
| A. Q Brand | 362 |
| H₂O | 478 |
| B. Al₂(SO₄)₃·18H₂O | 13.1 |

TABLE 4-continued

| Example | Ethanol + NH4OH 7 |
|---|---|
| H2SO4 (98%) | 31.9 |
| H2O | 658 |
| C. Ethanol | 131 |
| NH4OH, Conc., ml | 148 |
| Mole Ratio of Mix | |
| Ethanol | 146 |
| NH4OH | 114 |
| Na2O | 8.6 |
| Al2O3 | 1.0 |
| SiO2 | 94.0 |
| H2O | 3870 |
| Na2SO4 | 19.0 |
| Crystallization | Stirred |
| Temp., °F. | 350 |
| Time, hrs | 21 |
| Product | |
| X-Ray Analysis | ZSM-5 |
| Composition, mole Ratio | |
| N2O | 0.07 |
| Na2O | 0.87 |
| Al2O3 | 1.00 |
| SiO2 | 67.8 |
| Catalytic Properties | |
| M-Forming Screening Test (600° F., 400 psig, 15 WHSV, 3/1 H2/HC) (1.5 g catalyst-charged 50/50 wt n-heptane/benzene) | |
| Type Catalyst | H+ (1) |
| n-Heptane Conv., wt % | 76.6 |
| Benzene Conv., wt % | 26.4 |
| C7+ Aromatics Prod., wt % | 24.9 |
| Selectivity | 0.31 |

(1)NH4 Exch., 210° F. without pre-calcination Na = 0.01%

TABLE 5

| | Ethanol + NH4OH + Seeds | | | | |
|---|---|---|---|---|---|
| Example | 8 | 9 | 10 | 11 | 12 |
| Mix Components - gms. | | | | | |
| A. Q-Brand | 360 | 45 | 45 | 255.2 | 45 |
| H2O | 450 | 56.3 | 56.3 | 280 | 56.3 |
| Ludox (29.5% SiO2) | 450 | 56.3 | 56.3 | 280 | 56.3 |
| B. Al2(SO4)3·18H2O | 12.42 | 1.54 | 1.54 | 20.0 | 6.0 |
| H2SO4 | 30.0 | 3.75 | 3.75 | 20.0 | 2.25 |
| H2O | 616 | 77.0 | 77.0 | 480 | 77.0 |
| C. Ethanol | 124 | 15.5 | 15.5 | 124 | 15.5 |
| NH4OH conc., ml. | 140 | 17.5 | 17.5 | 140 | 17.5 |
| D. ZSM-5 seeds (19.3% solids) | 26.0 | 3.25 | 3.25 | 21.0 | 3.25 |
| Mole Ratio of Mix | | | | | |
| Ethanol | 73 | 73 | 146 | 90 | 336 |
| NH4OH | 115 | 115 | 115 | 69 | 28.5 |
| Na2O | 8.6 | 8.6 | 8.6 | 2.56 | 1.66 |
| Al2O3 | 1.0 | 1.0 | 1.0 | 1.0 | 1.0 |
| SiO2 | 94.0 | 94.0 | 94.0 | 40.8 | 23.9 |
| H2O | 3870 | 2870 | 3870 | 1700 | 990 |
| Na2SO4 | 19.0 | 19.0 | 19.0 | 9.7 | 5.4 |
| ZSM-5 Seeds, % Final Product | 5.7 | 5.7 | 5.7 | 5.5 | 4.5 |
| Crystallization | stirred | static | static | stirred | static |
| Temp., °F. | 350 | 446 | 255 | 350 | 400 |
| Time, hrs. | 17 | 22 | 334 | 120 | 96 |
| Product | | | | | |
| X-Ray Analysis | ZSM-5 | ZSM-5 | ZSM-5 | ZSM-5 | ZSM-5 |
| % Cryst. | 95 | 110 | 95 | 80 | 65 |
| Composition, wt % | | | | | |
| N | 0.053 | 0.13 | 0.19 | 0.011 | 0.016 |
| C | 0.42 | | | | |
| Na | 1.3(1) | 0.98 | | 1.7(1) | 3.2 |
| Al2O3 | 2.53 | 2.13 | | 4.36 | 6.40 |
| SiO2 | 97.2 | 95.6 | | 92.8 | 88.2 |
| Composition, mole ratio | | | | | |
| N2O | 0.08 | 0.24 | | 0.01 | |
| Na2O | 1.14 | 1.02 | | 0.87 | 1.1 |
| Al2O3 | 1.0 | 1.0 | | 1.00 | 1.0 |
| SiO2 | 65.3 | 76.2 | | 36.1 | 23.4 |
| Catalytic Properties | | | | | |
| M-Forming Screening Test (600° F., 400 psig, 15 WHSV, 3/1 H2/HC, 1.5 g. catalyst - charge 50/50 wt n-Heptane/Benzene) | | | | | |
| Type Catalyst | H+(2) | | | H+(2) | |
| n-Heptane Conv., wt % | 80.2 | | | 95.0 | |
| Benzene Conv., Wt % | 32.0 | | | 27.8 | |
| C7+ Aromatics Prod., wt % | 28.9 | | | 27.4 | |
| Selectivity | 0.32 | | | 0.28 | |

(1)These values are reduced to 0.03% for Example 8 and 0.05% for Example 11. When uncalcined samples are exchanged with NH4Cl.
(2)Calcination 1000° F. + NH4+ Exchange

| | |
|---|---|
| % Cryst. | 110 |
| Composition, wt % | |
| N | 0.044 |
| Na | 0.94 |
| Al2O3 | 2.41 |
| SiO2 | 96.1 |

We claim:

1. A synthetic crystalline zeolitic molecular sieve having a chemical composition expressed in terms of moles of oxides of $$0.9 \pm 0.3\, M_{2/n}O: Al_2O_3: 30\text{--}350\, SiO_2: 0\text{--}40\, H_2O$$

wherein M represents a metallic cation and n represents the valence of M, and having an X-ray powder diffraction pattern having at least the d-spacings set forth in Table I of patent 3,702,886, said zeolitic molecular sieve after being calcined in air at a temperature of 600° C. having an infra-red spectrum exhibiting substantially no absorption within the range of 3600–3100 cm$^{-1}$, said zeolitic molecular sieve in the uncalcined state being substantially free of organic nitrogen components.

2. Composition according to claim 1 wherein M represents sodium cations.

3. Process for preparing the composition of claim 1 which comprises forming an aqueous reacting mixture consisting essentially of inorganic reagents and having the following composition in terms of mole ratios of oxides:
   SiO$_2$/Al$_2$O$_3$—10 to 60
   Na$_2$O/SiO$_2$—0.005 to 0.4
   H$_2$O/Na$_2$O—20 to 600
and maintaining said reaction mixture for a period of from 6 hours to 60 days at a temperature of from 75° C. to 175° C. wherein seed crystals of a crystalline molecular sieve having an x-ray powder diffraction pattern having at least the d-spacings set forth in Table I of U.S. Pat. No. 3,702,886 are incorporated into the aqueous reaction mixture.

4. Process for preparing the composition of claim 1 which comprises forming an aqueous reaction mixture consisting essentially of inorganic reagents and having the following composition in terms of mole ratios of oxides:
   SiO$_2$/Al$_2$O$_3$—5 to 100
   Na$_2$O/SiO$_2$—0.035 to 0.5
   H$_2$O/Na$_2$O—20 to 600
and maintaining said reaction mixture for a period of from 6 hours to 60 days at a temperature of from 75° C. to 175° C. wherein seed crystals of a crystalline molecular sieve having at least the d-spacings set forth in Table I of U.S. Pat. No. 3,702,886 are incorporated into the reaction mixture.

5. Process for preparing a synthetic crystalline zeolitic molecular sieve having a chemical composition expressed in terms of moles of oxides of $$0.9 \pm 0.3 M_2O: Al_2O_3: 30\text{--}350\, SiO_2: 0\text{--}40\, H_2O$$

wherein M represents a metallic cation, and having at least the d-spacings set forth in Table I of U.S. Pat. No. 3,702,886, said zeolitic molecular sieve after being calcined in air at a temperature of 600° C. having an infra-red spectrum exhibiting substantially no absorption within the range of 3600–3100 cm$^{-1}$; which process comprises forming an aqueous reaction mixture consisting essentially of inorganic reagents and having the following composition in terms of mole ratios of oxides:
   SiO$_2$/Al$_2$O$_3$—10 to 60
   Na$_2$O/SiO$_2$—0.05 to 0.4
   H$_2$O/Na$_2$O—20 to 600
and maintaining said reaction mixture at a temperature of from 75° C. to 175° C. for a period of from 6 hours to 60 days wherein seed crystals of a crystalline molecular sieve having an x-ray powder diffraction pattern having at least the d-spacing set forth in Table I of U.S. Pat. No. 3,702,886 are incorporated into the aqueous reaction mixture.

6. Process for preparing a synthetic crystalline zeolitic molecular sieve having a chemical composition expressed in terms of moles of oxides of $$0.9 + 0.3 M_2O: Al_2O_3: 30\text{--}350\, SiO_2: 0\text{--}40\, H_2O$$

wherein M represents a metallic cation, and having at least the d-spacings set forth in Table I of U.S. Pat. No. 3,702,886, said zeolitic molecular sieve after being calcined in air at a temperature of 600° C. having an infrared spectrum exhibiting substantially no absorption within the range of 3600–3100 cm$^{-1}$; which process comprises forming an aqueous reaction mixture consisting essentially of inorganic reagents and having the following composition in terms of mole ratios of oxides:
   SiO$_2$/Al$_2$O$_3$—5 to 100
   Na$_2$O/SiO$_2$—0.035 to 0.5
   H$_2$O/Na$_2$O—20 to 600
and maintaining said reaction mixture at a temperature of from 75° C. to 175° C. for a period of from 6 hours to 60 days wherein seed crystals of a crystalline molecular sieve having an x-ray powder diffraction pattern having at least the d-spacings set forth in Table I of U.S. Pat. No. 3,702,886 are incorporated into the reaction mixture.

7. A synthetic crystalline zeolitic molecular sieve having a chemical composition expressed in terms of moles of oxides of $$0.9 \pm 0.3 M_{2/n}O: Al_2O_3 30\text{--}350\, SiO_2: 0\text{--}40\, H_2O$$

wherein M represents a metallic cation and n represents the valence of M, and having an X-ray powder diffraction pattern having at least the d-spacings set forth in Table I of patent 3,702,886, said zeolitic molecular sieve in the uncalcined state being substantially free of organic nitrogen components.

8. Composition according to claim 7 wherein M represents sodium cations.

9. Process for preparing the composition of claim 7 which comprises forming an aqueous reaction mixture consisting essentially of inorganic reagents and having the following composition in terms of mole ratios of oxides:
   SiO$_2$/Al$_2$O$_3$—10 to 60
   Na$_2$O/SiO$_2$—0.05 to 0.4
   H$_2$O/Na$_2$O—20 to 600
wherein seed cyrstals of a crystalline molecular sieve having an X-ray powder diffraction pattern having at least the d-spacings set forth in Table I of U.S. Pat. No. 3,702,886 are incorporated into the aqueous reaction mixture and maintaining said reaction mixture for a period of from 6 hours to 60 days at a temperature of from 75° to 175° C.

10. Process for preparing the composition of claim 7 which comprises forming an aqueous reaction mixture consisting essentially of inorganic reagents and having the following composition in terms of mole ratios of oxides:
   SiO$_2$/Al$_2$O$_3$—5 to 100
   Na$_2$O/SiO$_2$—0.035 to 0.5
   H$_2$O/Na$_2$O—20 to 600
and maintaining said reaction mixture for a period of from 6 hours to 60 days at a temperature of from 75° C. to 175° C., wherein seed crystals of a crystalline molecular sieve having at least the d-spacings set forth in Table 1 of U.S. Pat. No. 3,702,886 are incorporated into the reaction mixture.

* * * * *